United States Patent [19]

Hehl

[11] Patent Number: 4,544,340

[45] Date of Patent: Oct. 1, 1985

[54] ATTACHMENT MECHANISM FOR INTERCHANGEABLE INJECTION MOLDING DIES

[76] Inventor: Karl Hehl, Arthur-Hehl-Strasse 32, 7298 Lossburg 1, Fed. Rep. of Germany

[21] Appl. No.: 636,325

[22] Filed: Jul. 31, 1984

Related U.S. Application Data

[63] Continuation-in-part of Ser. No. 449,550, Dec. 13, 1982, Pat. No. 4,473,346.

[30] Foreign Application Priority Data

Aug. 2, 1983 [DE] Fed. Rep. of Germany ....... 3327806

[51] Int. Cl.⁴ .............................................. B29F 1/022
[52] U.S. Cl. .................... 425/183; 425/185; 425/186; 425/190; 425/192 R; 425/589
[58] Field of Search ............... 425/183, 185, 186, 190, 425/192 R, 542, 589; 249/68

[56] References Cited

U.S. PATENT DOCUMENTS

| | | | |
|---|---|---|---|
| 2,398,893 | 4/1946 | Quarnstrom | 249/68 |
| 4,116,599 | 9/1978 | Rüegg | 425/192 R |
| 4,202,522 | 5/1980 | Hanas | 425/185 |
| 4,348,165 | 9/1982 | Vostrovsky | 425/190 |

Primary Examiner—Jay H. Woo
Assistant Examiner—Timothy W. Heitbrink
Attorney, Agent, or Firm—Joseph A. Geiger

[57] ABSTRACT

A mechanism for the clamping attachment of interchangeable injection molding dies to the die carrier plates of an injection molding machine featuring a plurality of clamping plungers in axial guide bores of the die carrier plates, each clamping plunger having a clamping nose engaging a clamping shoulder of an oversized back plate of the die half, clamping the latter against the die carrier plate, when forcibly retracted by means of a transversely guided wedge rod driven by a hydraulic cylinder assembly. The wedge rod engages opposite faces of an inclined transverse plunger bore, for a self-locking clamping drive configuration and a positive extension drive configuration.

20 Claims, 7 Drawing Figures

ATTACHMENT MECHANISM FOR INTERCHANGEABLE INJECTION MOLDING DIES

RELATED APPLICATION

Continuation-in-part of copending application Ser. No. 449,550 of Dec. 13, 1982, now U.S. Pat. No. 4,473,346.

BACKGROUND OF THE INVENTION

1. Field of the Invention

The present invention relates to injection molding machines and, more particularly, to a hydraulic mechanism for the clamping attachment of interchangeable injection molding dies to the carrier plates of the die closing unit of an injection molding machine.

2. Description of the Prior Art

An important factor in the cost of injection molding is the machine downtime and the skilled labor which are required in conjunction with the changeover from one injection molding die to another. This cost element becomes more important, as production runs become shorter. Shorter production runs, on the other hand, make it possible to reduce product inventory costs.

It has therefore already been suggested to at least partially mechanize the attachment and removal of interchangeable injection molding dies from the die closing unit of an injection molding machine. An important element of this mechanization is the precise and reliable clamping attachment of the two die halves to the stationary and movable die carrier plates of the die closing unit.

One such attachment mechanism is disclosed in "Kunststoffe" Vol. 70 (1980) Issue 3, pp. 128–131 and in the circular "Engel-Information" A-67-TV-9/81 of the Ludwig Engel KG, 4311 Schwertberg, Austria. This prior art mechanism features four axially oriented clamping pins which are bolted to the back side of each die half, so as to be engageable into matching positioning bores of the associated stationary or movable die carrier plate. Each axial positioning bore is intersected by a radial bore inside which is guided a wedge member which is extendable and retractable by means of a hydraulic actuator. Each positioning pin has a transverse bore with an inner drive taper which cooperates with an outer taper of the wedge member, so that the latter, when advanced into the bore, creates a clamping traction on the clamping pin. The wedge taper may be such that the wedge member and the clamping pin create a self-locking action.

The need for clamping pins which extend from the back plates of the die halves represents a disadvantage, inasmuch as the insertion of the injection molding die requires a much greater opening of the die closing unit as would be the case without the clamping pins. Accordingly, the injection molding die has to be held in alignment with the die carrier plates, while the latter are approached for engagement of the clamping pins into the positioning bores.

A similar arrangement is suggested in U.S. Pat. No. 4,116,599, where each die half carries two axially extending clamping pins which reach through the associated die carrier plate into engagement with transversely slidable wedge members which are arranged on the back side of the die carrier plate. This configuration may make it necessary to insert each die half separately, when the overall axial length of the closed injection molding die exceeds the maximum plate opening of the die closing unit.

An additional shortcoming of these prior art attachment mechanisms relates to the fact that an element of positioning inaccuracy is present, due to the need for a certain engagement clearance between the clamping pins and the positioning bores. Within this clearance, the die halves may be displaced out of alignment by the action of the wedge members on the clamping pins.

It is also known to provide injection molding dies with oversize back plates of standardized dimensions, in line with a trend to apply building block principles to the manufacture of injection molding dies. Standardized back plates are listed in "Normalien für Formwerkzeuge", Katalog K 400 Europa-Reihe of Firma Sustan, Frankfurt, Germany, and EOC-Normalien of EO-Cummernel KG, Lüdenscheid, Germany. Oversize back plates are also disclosed in U.S. Pat. No. 2,398,893.

Another prior art suggestion for a mechanized clamping of the die halves to the die carrier plates involves the use of clamping claws which are rotatably supported on the die carrier plates and which engage an oversize back plate of each die half through rotation and a subsequent axial clamping movement. This mechanism requires a comparatively complex actuating drive, and it has the additional disadvantage of making it impossible to use a self-locking action in the clamped position, due to the need for rotating the clamping claw. The absence of a self-locking action constitutes a risk factor, inasmuch as a hydraulic failure of the actuating drive could cause considerable damage to the injection molding die and to the die closing unit.

SUMMARY OF THE INVENTION

Underlying the present invention is the primary objective of devising an improved mechanism for the attachment of interchangeable injection molding dies which does not have the earlier-described shortcomings and which produces a reliable clamping attachment, without the need for opening the injection molding die or closing the die carrier plates against the die halves during the die attachment procedure.

The present invention proposes to attain this objective by suggesting a mechanism for the clamping attachment of interchangeable injection molding dies to the die carrier plates of the die closing unit which features at least two axially movable clamping plungers in each die carrier plate, in guide bores which are located diametrically opposite to the center axis of the die closing unit, which clamping plungers have forwardly protruding extremities in the shape of a clamping nose with a rearwardly facing clamping face engaging clamping shoulders of the die halves.

A preferred embodiment of the invention features retracting means for the clamping plungers which include a transverse bore in each plunger which is engaged by an axially movable wedge rod. The transverse bore and the wedge plunger have cooperating tapered faces producing an elevated plunger retraction force, and each wedge rod also has a forwardly facing drive protrusion cooperating with a rearwardly facing extension drive taper in the transverse plunger bore to produce a positive plunger extension force.

The drive protrusion of the wedge rod is preferably a threaded drive pin which is seated in a transverse bore of the wedge rod and secured with a two-component adhesive. The threaded drive pin is accessible through an axial lubricating channel in the clamping plunger.

The cooperating tapered faces in the transverse bore of the clamping plunger and on the wedge rod produce a self-locking action, thus preventing the accidental release of the injection molding die in the case of depressurization of the hydraulic cylinders.

By arranging the tapers of the clamping plunger and of the wedge rod in such a way that the latter has to be pulled, in order to retract the clamping plunger, the highest force output of the double-acting hydraulic cylinder can be applied to the release of the wedge rod from its self-locking position.

In order to provide the clamping shoulders on the die halves, the invention further suggests the attachment of a standardized back plate to each die half which is radially larger than the latter, so as to form protruding flange portions. These radially protruding flange portions have clamping shoulders on their forward sides and guide faces on their radially outer sides. The flange portions reach into lateral recesses of the clamping plungers behind their clamping noses.

This configuration allows for the insertion and removal of the injection molding die between die carrier plates which are in sliding contact, or near-contact, with the back plates of the injection molding die. The advantages of this die insertion procedure are twofold: the die carrier plates serve to axially position and guide the injection molding die during insertion, and the clamping plungers can be actuated immediately following the insertion movement, without moving the die carrier plates in the axial direction.

The invention also suggests the arrangement of simple guide bars on the die carrier plate which support the injection molding die during horizontal insertion, and the provision of abutment pins which stop the insertion movement in the centered position of the injection molding die.

The proposed die attachment mechanism has the advantage of making it impossible for the clamping plungers to transmit radial forces to the die halves of the injection molding die, during their attachment to the die carrier plate. This is not the case with the earlier-mentioned prior art devices, which are subject to alignment distortions caused by the action of the wedge members.

Another advantage of the present invention resides in the fact that the purely radial insertion movement of the injection molding die lends itself to the automatic coupling of the die with its fluid supply and fluid return lines and to the automatic uncoupling, when the die is removed from the die closing unit. This feature requires a standardization of the supply line couplings on the interchangeable injection molding dies.

The arrangement of the clamping members to remain inside the die carrier plates contrasts with the prior art suggestion of attaching clamping pins to each injection molding die and, in addition to greatly reducing the number of special parts required, has the further advantage of allowing for the wedge rods to remain in permanent engagement with the clamping plungers, with the result that the displacements of the wedge rods and the dimensions of the hydraulic cylinder assemblies are considerably reduced.

The invention proposes to arrange these hydraulic cylinder assemblies on the horizontal upper and lower sides of the die carrier plates, thereby minimizing the space requirements of the die attachment mechanism and facilitating the use of the building block principle in connection with die closing units of different size.

The positively driven extension movements of the clamping plungers assure the full extension of the plungers when they are released, so as to preclude the possibility of a collision between the back plate of a die half and the clamping nose of a partially extended clamping plunger. This feature is important in connection with partially or fully mechanized devices for the exchange of injection molding dies.

BRIEF DESCRIPTION OF THE DRAWINGS

Further special features and advantages of the invention will become apparent from the description following below, when taken together with the accompanying drawings which illustrate, by way of example, preferred embodiments of the invention represented in the various figures as follows.

DESCRIPTION OF THE PREFERRED EMBODIMENT

To the extent that it relates to FIGS. 1 through 4, the following description corresponds to the description given in application Ser. No. 449,550 of Dec. 13, 1982, now U.S. Pat. No. 4,473,346.

Figure 1:
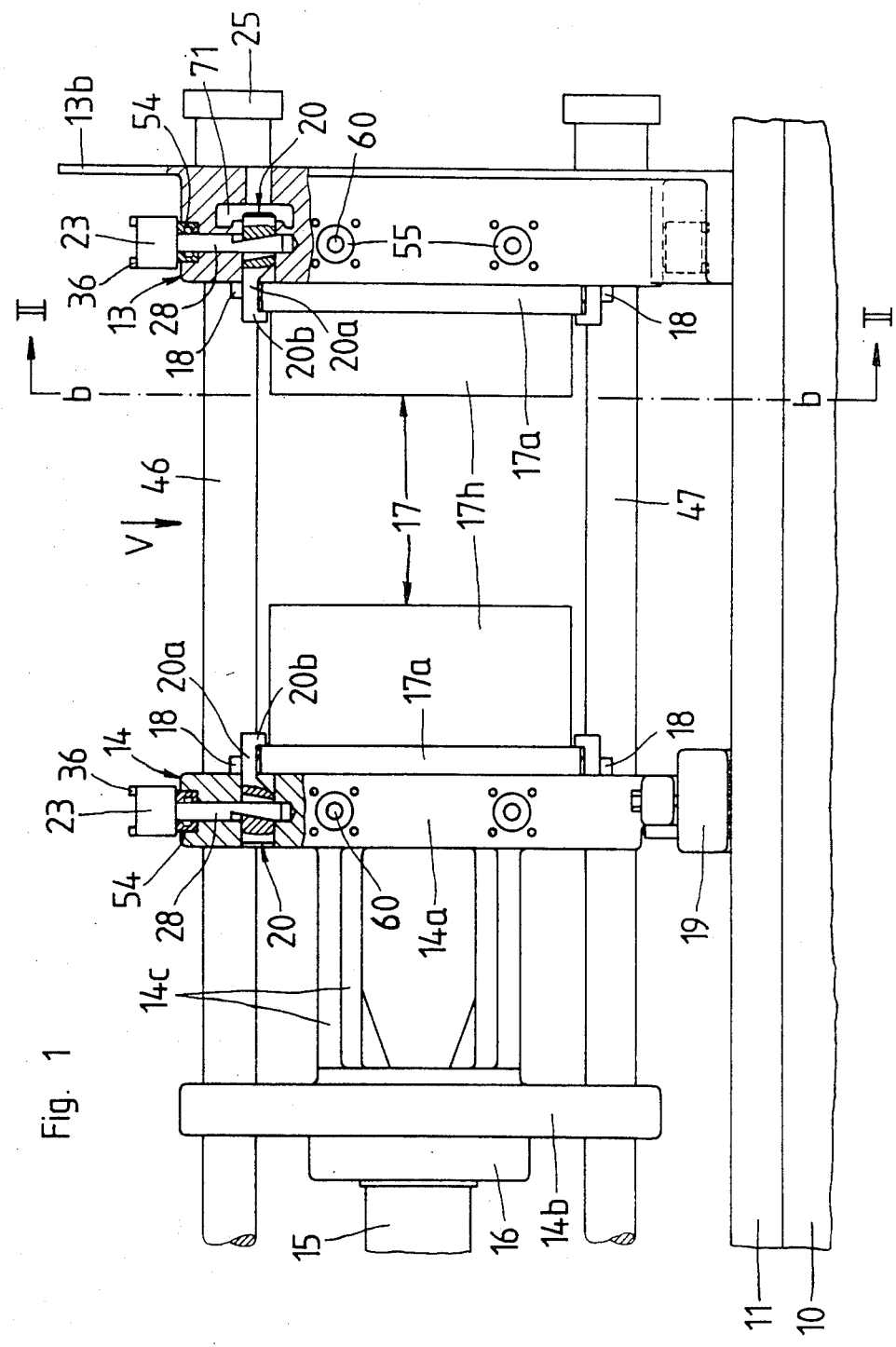
FIG. 1 shows a push-type die closing unit of an injection molding machine with partially cross-sectioned die carrier plates and with a mechanism for the attachment of interchangeable injection molding dies.
Figure 2:
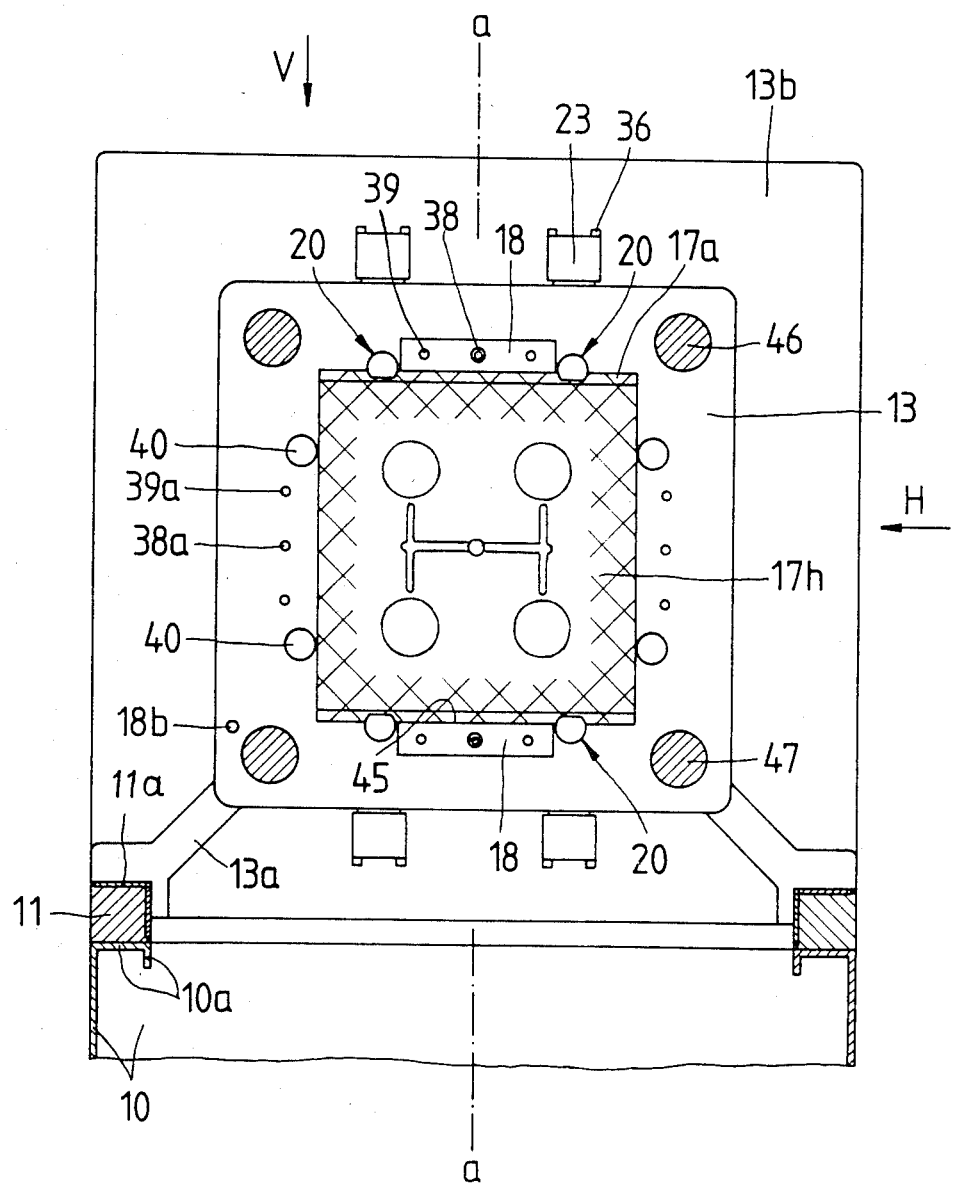
FIG. 2 is a cross-sectional axial view of the die closing unit of FIG. 1, the cross section being taken along line II—II thereof.

FIGS. 1 and 2 of the drawing show a push-type die closing unit which is mounted on a machine base 10 which is reinforced with two parallel guide rails 11. The guide rails 11 are welded to edge formations 10a of the machine base 10 and carry hardened angled runway strips 11a. The entire die closing unit is supported and centered on the two guide rails 11.

The die closing unit consists essentially of a stationary die carrier plate 13, a likewise stationary cylinder head plate, not shown in the drawing, four parallel tie rods 46 and 47 which are rigidly bolted to the stationary die carrier plate 13 and to the cylinder head plate, and a movable die carrier plate 14 which is guided for die opening and closing movements along the tie rods 46 and 47.

The die opening and closing movements are produced by a hydraulic actuator assembly, likewise not shown, which is attached to the cylinder head plate and has a piston rod 15 connected to the die carrier plate 14. The movable die carrier plate 14 is part of a movable die carrier frame which consists of a pressure transfer wall 14b, a die mounting wall 14a, and horizontal pressure transfer ribs 14c which serve as stiffening members. A base plate 16 connects the piston rod 15 to the pressure transfer wall 14b. The weight of the movable die carrier frame is supported directly on the guide rails 11 by means of special guide assemblies 19 which ride on the runway strips 11a.

The stationary die carrier plate 13 has two diagonally extending mounting struts 13a with which it rests on the guide rails 11. A large rectangular reinforcing shield 13b circumscribes the die carrier plate 13. The stationary cylinder head plate (not shown) has similar mounting struts and a similar reinforcing shield. The two upper tie rods 46 and the two lower tie rods 47 are fitted into bores of these two stationary plates and axially clamped to these plates by means of special clamping devices 25.

FIG. 1 shows an injection molding die 17 consisting of two die halves 17h, mounted in the die closing unit. The stationary die carrier plate 13 carries a stationary die half 17h, and the movable die carrier plate 14 carries a movable die half 17h. In terms of the present invention, which relates to the attachment of the die halves 17h to the two die carrier plates 13 and 14, it is of no consequence whether the carrier plate and the attached die half are stationary or movable. It should be understood, therefore, that all the references to a die carrier plate and to a die half which do not specifically indicate the stationary or movable state, apply equally to both.

Figure 3:
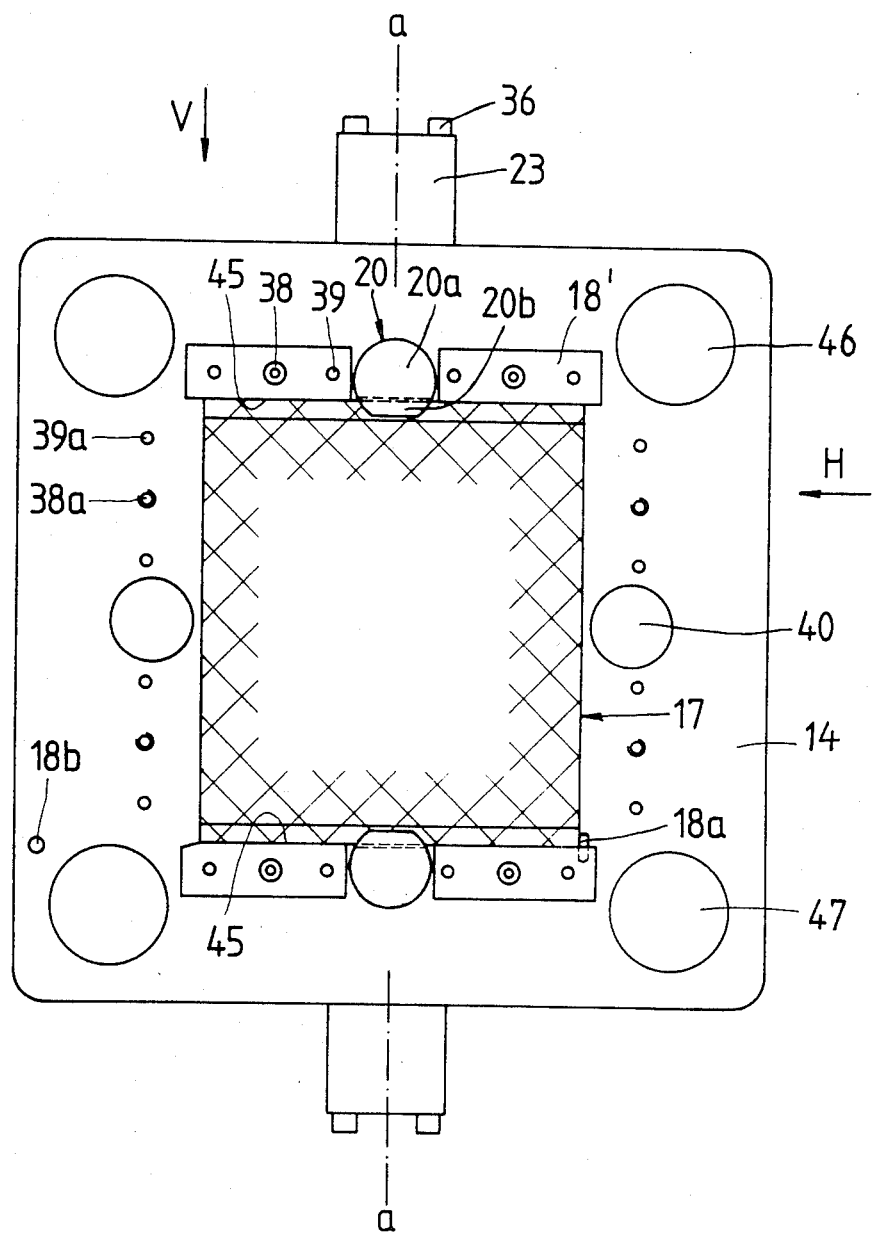
FIG. 3 represents an enlarged cross-sectional view of the die closing unit which is similar to FIG. 2 while featuring a modified arrangement of the mechanism of the invention.
Figure 4:
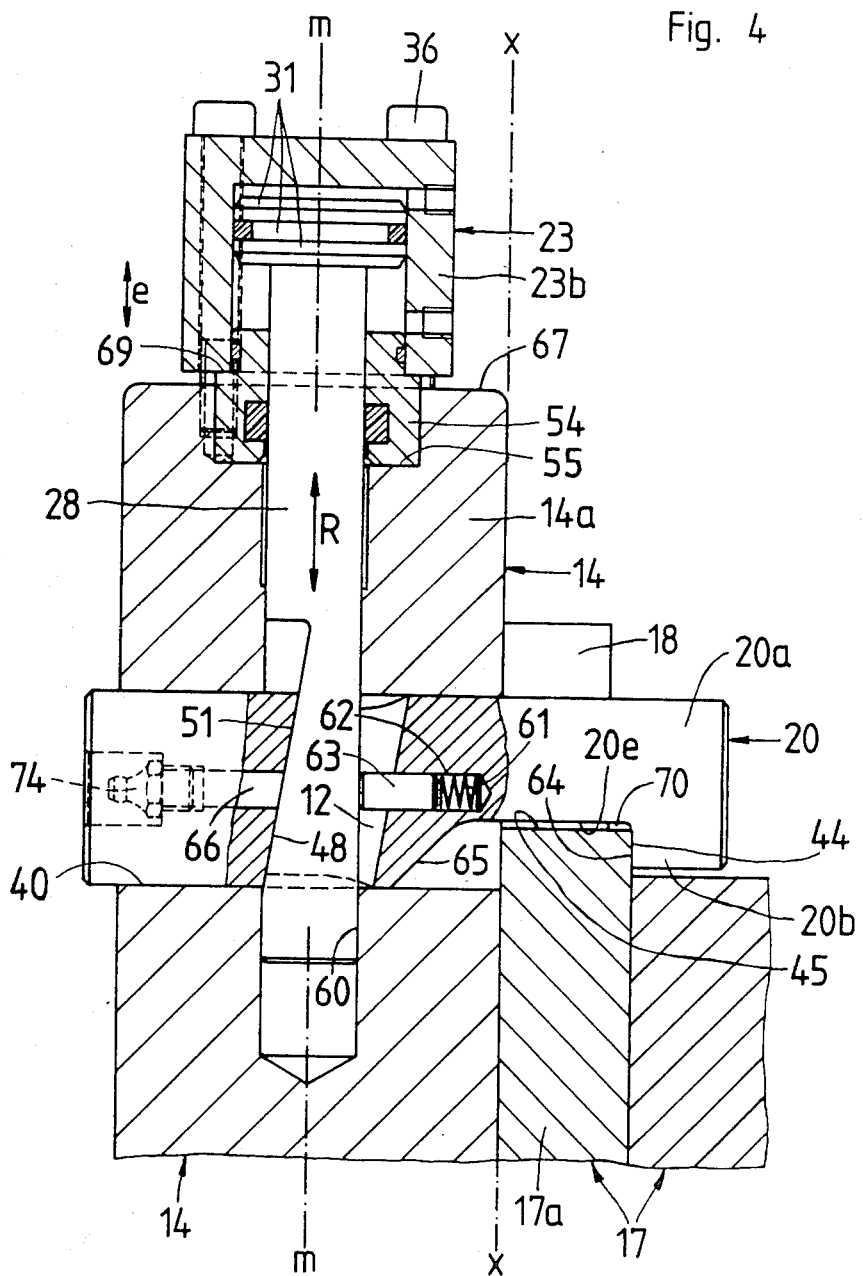
FIG. 4 shows a greatly enlarged detail of the die attachment mechanism of FIG. 1.

In each die carrier plate are arranged four or two clamping plungers 20, as can be seen in FIG. 2 and FIG. 3, respectively. The clamping plungers 20 are received in axial guide bores 40 of the die carrier plates 13 and 14 which are located diametrically opposite the center axis of the die closing unit and in the vicinity of the edges of the injection molding die. For an injection molding die 17 which is to be inserted and removed in a horizontal direction, the clamping plungers 20 are arranged above and below the horizontal upper and lower edges of the die halves 17h.

In order to obtain a clamping engagement between the clamping plunger 20 and the die halves 17h, the latter have standardized back plates 17a which exceed the regular dimensions of the die halves 17h on at least those sides on which the clamping plungers 20 are located. The back plates 17a thus form radially outwardly protruding flange portions defining forwardly facing clamping shoulders 44 on diametrally opposite sides of each die half 17h. The flange portions of the back plates 17a reach into lateral recesses 70 in the forwardly protruding extremities 20a of the clamping plungers 20. The recesses 70 define a clamping nose 20b on the protruding extremities 20a with a rearwardly facing clamping face 64 cooperating with the clamping shoulders 44 of the back plates 17a.

While the cooperating clamping shoulders 44 of the die back plates 17a and the clamping faces 64 of the clamping plungers are preferably oriented radially, it should be understood that these faces and shoulders could also be inclined to obtain a wedging action. In all cases, however, the axial projection of the clamping plungers 20, at their protruding extremities 20a, and the back plates 17a of the die halves overlap to produce a clamping engagement, when the clamping plungers 20 are retracted in the direction of the die carrier plate 13 or 14.

The proposed clamping attachment configuration makes it possible to obtain a die clamping action with a minimal axial displacement of the clamping plungers 20 in the order of one to two millimeters. With the clamping plungers 20 in an extended position, in which their clamping faces 64 are a small distance removed from the clamping shoulders 44 of the back plates 17a, the die halves 17h are slidable radially along the mounting faces of the two die carrier plates 13 and 14, for the insertion or removal of an injection molding die 17. During this sliding movement, the protruding flange portions of the back plates 17a move through the lateral recesses 70 of the clamping plungers 20 with a small clearance to the bottom 20e of the recess 70.

The die halves 17h are guided during the insertion and removal of the injection molding die by means of horizontal guide bars 18—vertical guide bars in the case of vertical insertion and removal—which are attached to the die carrier plates 13 and 14 and which bear against guide faces 45 on the outer sides of the back plates 17a. While FIGS. 2 and 3 show both upper and lower guide bars 18 or 18', respectively, it should be understood that, in view of the weight of the injection molding die, it may suffice to use only lower guide bars 18 or 18'.

The lower guide bars 18 or 18' also serve to center the die halves 17h in relation to their die carrier plates 13 and 14 in the vertical sense. Centering in the horizontal sense is achieved by means of abutment pins 18a (FIG. 3) which are anchored in the guide bars 18'. The pins 18a stop the back plate 17a of the die in the horizontally centered position. Alternatively, the horizontal centering position may be provided by a power-driven die insertion device (not shown) which stops its movement in the correct position.

The invention thus makes it possible to insert and remove an injection molding die in its closed position, without requiring axial displacements of the movable die carrier plate 14 and/or of the injection molding die itself in relation to the stationary die carrier plate 13. While it is possible to remove an injection molding die from between the die carrier plates, when the latter contact the back plates 17a of the die without pressure, it is normally preferable to have the axial distance between the die carrier plates 13 and 14 exceed the axial width of the closed injection molding die 17 by approximately 0.5 mm.

The clamping action between the clamping plunger 20 and the die half 17h is obtained by forcibly retracting the clamping plunger in the direction of the die carrier plate 13 or 14. For this purpose, each clamping plunger 20 interacts with a transversely guided wedge rod 28 which engages a transverse bore 12 in the guided rear portion of the clamping plunger 20. The wedge rod 28 is an integral extension of the piston rod of a hydraulic cylinder assembly 23 which is mounted on the upper or lower side 67 of the die carrier plate 13 or 14, in perpendicular alignment with the clamping plunger 20.

The transverse bore 12 of the clamping plunger 20 and the wedge rod 28 have cooperating matching tapers 48 and 51, respectively, which are inclined in relation to the center axis m—m of the wedge rod 28, so as to produce a plunger retracting action, when the wedge rod 28 is pulled radially outwardly by the hydraulic cylinder assembly 23. The angle of inclination of the tapered friction faces 48 and 51 is preferably equal or smaller than the release angle, so that a self-locking effect is produced and axial forces acting on the clamping plunger 20 will not displace the wedge rod 28, even in the case of an accidental de-pressurization of the hydraulic cylinder assembly 23.

The comparatively small taper angle also means that it is possible to obtain an elevated clamping force with a comparatively small piston 31 executing a piston stroke c which, even though a multiple of the plunger retraction stroke, is still comparatively small, i.e. approximately one-third of the diameter of the clamping plunger 20. On the other hand, this configuration produces an axial clamping force on the clamping plunger 20 which is a multiple of the force applied to the wedge rod 28 by the cylinder assembly 23. These small actuation strokes and compact hydraulic controls are possible thanks to the arrangement of the clamping plungers 20 in the die carrier plates in a clamping configuration in which they require only very small axial displacements.

The wedge rod 28 is guided on opposite sides of its taper 51 in the guide bore 60 and, in the area of the opening of the guide bore 60, by a guide bushing 54. The latter has a portion received in a recess 55 on the outer side 67 of the die carrier plate. The guide bushing 54 also serves as a cover for the pot-shaped cylinder 23b, centering and positioning the latter by means of a centering collar and a shoulder 69. Screws 36 in the four corners of the cylinder 23b clamp the latter against the guide bushing 54.

In order to obtain a release movement of the clamping plunger 20, the latter carries a release spring 61 in a blind axial bore 62, the spring 61 being compressed to bear against the wedge rod 28 by means of a release pin 63. The release spring 61 assures that, when the wedge rod 28 moves radially inwardly, the tapered friction face 48 of the clamping plunger 20 remains in contact with the tapered friction face 51 of the wedge rod, as the clamping plunger 20 moves outwardly from the die carrier plate 13 or 14. The blind bore 62 also serves as a lubrication channel 66 for the tapered friction faces 48 and 51, having a lubrication fitting 74 in its rearward opening.

The wedge rod 28 remains permanently engaged in the transverse bore 12 of the clamping plunger 20, thereby securing the latter against rotation. It should be understood that the inclination of the cooperating tapers 48 and 51 of the clamping plunger 20 and wedge rod 28 could also be arranged in such a way that a pushing displacement of the wedge rod 28 produces a retraction of the clamping plunger 20. However, in view of the self-locking action of this drive, it is preferable to have the greater hydraulic force of the double-acting hydraulic cylinder assembly 23 applicable to the release movement of the wedge rod 28.

As can be seen in FIGS. 2 and 3, the clamping plungers 20 and their hydraulic drives can be reoriented for a vertical insertion and removal of the injection molding die. For this purpose, the die carrier plates 13 and 14 have appropriate guide bores 40 for the relocation of the clamping plungers 20, as well as pin bores 39a and threaded bores 38a for the pins 39 and screws 38 which attach the guide bars 18 or 18', respectively, to the die carrier plates. In the configuration for vertical insertion and removal, the lower horizontal guide bars 18 support the inserted but not yet attached die halves 17h in centered alignment with the die carrier plates 13 and 14.

While the clamping plungers 20 of the drawings are shown in a preferred shape in which the clamping nose 20b does not protrude over the cylindrical outline of the clamping plunger 20, this is not a prerequisite for the application of the invention. Accordingly, it is also possible to define the clamping faces 44 of the clamping plungers 20 by means of axially adjustable nuts which are seated on the forward extremities of the clamping plungers. These clamping plungers would not require a lateral recess, in order to accommodate the outwardly protruding flange portions of the back plates 17a.

Figure 5:
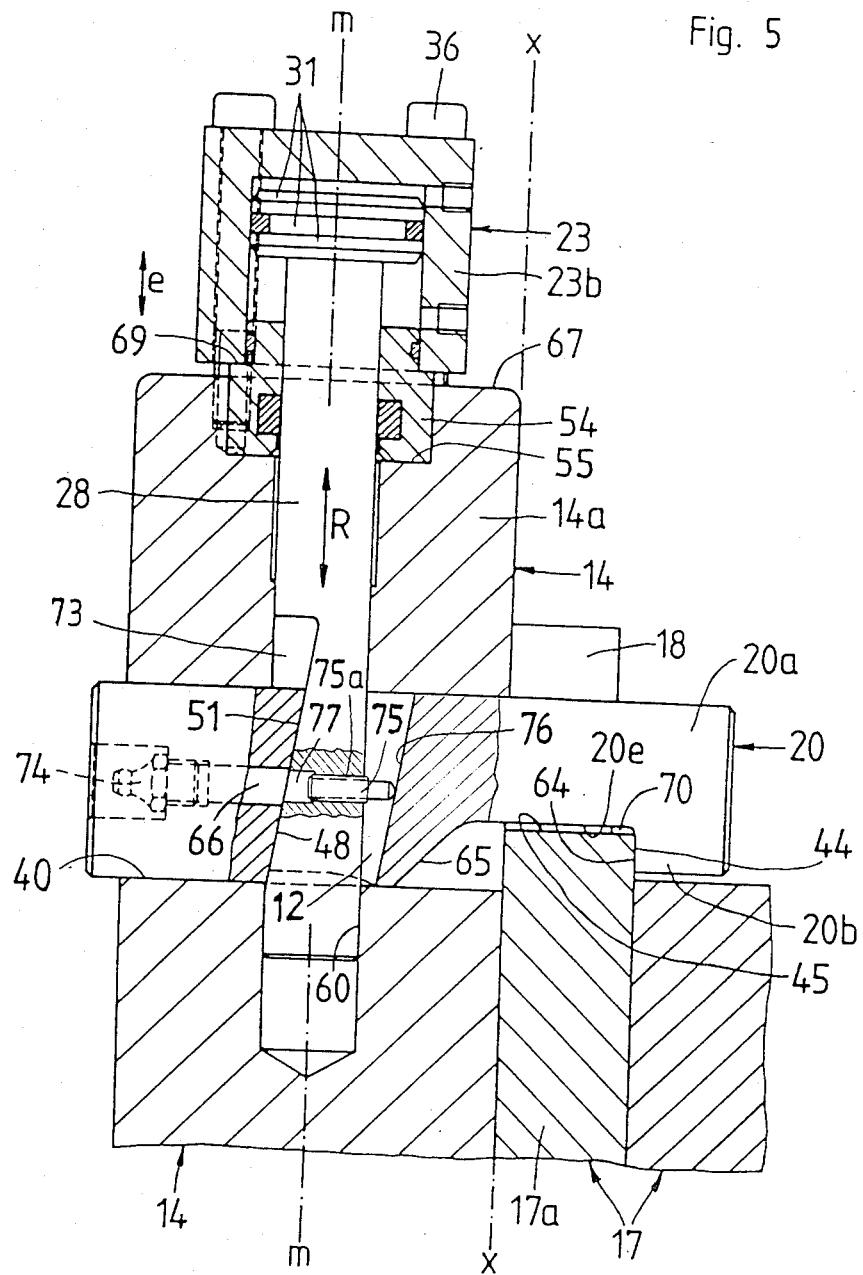
FIG. 5 is similar to FIG. 4, showing a further improved version of the attachment mechanism as an embodiment of the present invention.

The present invention differs from the invention which is disclosed and claimed in the parent application Ser. No. 449,550 of Dec. 13, 1982, now U.S. Pat. No. 4,473,346 primarily with respect to an improvement thereover which will be described in the following with reference to FIGS. 5, 6 and 7:

FIG. 5 shows a novel drive configuration between the clamping plunger 20 and the wedge rod 28 which produces a positively driven extension movement of the clamping plunger 20. For this purpose, the wedge rod 28 carries a drive pin 75 in sliding engagement with an extension drive taper 76 in the transverse bore 12 of the clamping plunger 20. The drive pin 75 has a threaded portion 75a seated in the female thread of a transverse bore 77 in the wedge rod 28.

The drive pin 75 is oriented parallel to the center axis of the clamping plunger 20 and, in the clamping end position of the wedge rod 28, is substantially aligned with that axis and with the central lubrication channel 66 in the clamping plunger 20. In this position of the wedge rod 28, and with the lubrication fitting 74 removed, the drive pin 75 can be inserted and/or adjusted through the lubrication channel 66. Once adjusted for a sliding fit with minimal or no clearance to the extension drive taper 76, the position of the drive pin is permanently secured by means of a two-component adhesive, for example.

The drive pin 75 has a spherical protruding extremity with which it bears against the extension drive taper 76. Consequently, when the wedge rod 28 executes an extension movement in the sense of moving deeper into the die carrier plate 13 or 14, the drive pin 75 moves against the inclined taper 76, thereby forcing the clamping plunger 20 to execute a corresponding extension movement in which its clamping nose 20b moves away from the back plate 17a.

Figure 6:
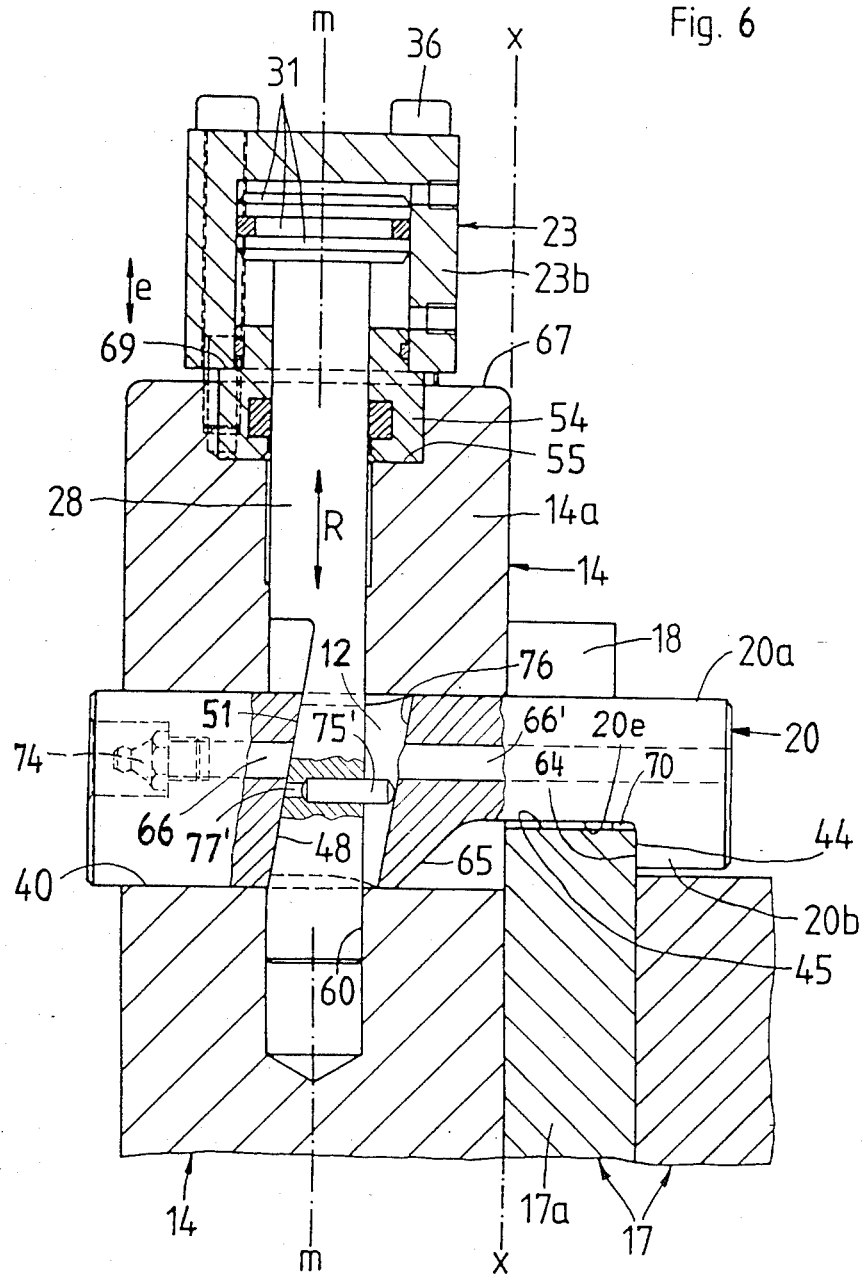
FIG. 6 is likewise similar to FIG. 4, showing another embodiment of the present invention.

FIG. 6 shows a modified arrangement in which the drive pin 75' is a simple cylindrical pin which is seated in a stepped transverse bore 77' of the wedge rod 28. The drive pin 75' is inserted through a forward portion 66' of the lubrication channel 66. The axis of the lubrication channel 66 is eccentrically offset from the axis of the clamping pluger 20 so that, even in the clamping end position of the wedge rod 28, the drive pin 75' remains laterally outside the axis of the lubrication bore 66. Insertion and removal of the drive pin 75' therefore necessitate the removal of the cylinder 23b and an outward movement of the piston 31 and its attached wedge rod 28 beyond the normal clamping end position.

The insertion channel for the drive pin 75' need not be an extension of the lubrication channel 66, but may be a bore which extends parallel thereto through the clamping plunger 20. Alternatively, the insertion channel may take the form of a longitudinal groove in the clamping plunger 20 which is located diametrically opposite its recess 70 so as to intersect the axis of the wedge rod 28.

Lastly, it is also possible to configure the clamping plunger drive in such a way that room is provided in the die carrier plate 13 or 14 along the guide bore 60 for the insertion and removal of the wedge rod 28 with an attached drive pin or other drive protrusion. This room may take the shape of a longitudinal insertion groove which extends from the recess 55 into the plunger guide bore 40.

Alternatively, it is possible to widen the guide bore 60 between the recess 55 and the plunger guide bore 40 to such an extent that the wedge rod and an attached drive protrusion are insertable through the widened bore. The latter would be occupied by an extension of the guide bushing 54 of matching diameter reaching into the vicinity of the clamping plunger 20.

Figure 7:
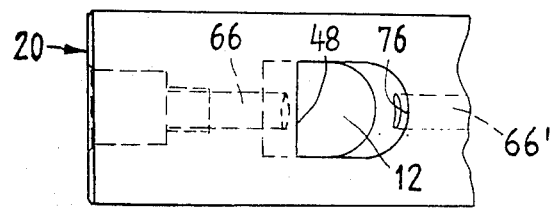
FIG. 7 shows a detail of the clamping plunger of FIG. 6.

FIG. 7 shows that, in cross section, the transverse bore 12 of the plunger 20 has a shape which is arched on one axial side and flat with right-angle corners on the opposite axial side. The extension drive taper 76 coincides with the apex of the arch, and the tapered face 48 of the clamping plunger 20, which cooperates with the tapered face 51 of the wedge rod 28, represents the base line of the cross section.

The tapered friction face 48 and the extension drive taper 76 are preferably parallel to each other. The special shape of the transverse bore 12 is produced in a reaming operation. However, it should be understood that the cross section of the bore 12 could also be rectangular or square and that the extension drive taper 76 could have a greater inclination than that of the tapered face 48, in which case the drive pin 75 would have a clearance to the taper 76 in the clamped position of the drive assembly.

The angle of inclination of the tapered face 48 and of the parallel extension drive taper 76 from the movement axis m—m of the wedge rod 28 is preferable 6° to 7°, for a self-locking cam action between the wedge rod 28 and the clamping plunger 20.

It should be understood, of course, that the foregoing disclosure describes only a preferred embodiment of the invention and that it is intended to cover all changes and modifications of this example of the invention which fall within the scope of the appended claims.

I claim the following:

1. A mechanism for the clamping attachment of interchangeable injection molding dies to the die carrier plates of an injection molding machine, which machine has a die closing unit defining a horizontal center axis and including a stationary and a movable die carrier plate with radially oriented parallel opposite die mounting faces for the attachment thereto of a stationary and a movable die half, the movable die carrier plate being guided on a plurality of horizontal tie rods and driven for opening and closing movements along said center axis, the die attachment mechanism comprising in combination:

at least two axially movable clamping plungers arranged in each die carrier plate in axial guide bores which are located on opposite sides of the center axis of the die closing unit, the clamping plungers having forward extremities protruding a distance from the die mounting faces of the associated die carrier plates;

a standardized back plate on the axially outer side of each die half, the back plate having an outer face adapted to be clamped to the die mounting face of the corresponding die carrier plate and radial dimensions which permit radial insertion and retraction of the back plate between the protruding extremities of said oppositely located clamping plungers, in a movement in which the outer face of the back plate moves along the die mounting face of the die carrier plate with minimal clearance, thereby making it possible to insert and attach a closed injection molding die, while the die carrier plates remain in a virtually closed position;

means defined by the back plates of the die halves and by the associated clamping plungers for clamping each back plate to the die mounting face of the corresponding die carrier plate, when the clamping plungers are retracted in the direction of the die mounting plate; and means for forcibly retracting the clamping plungers in the direction of the die mounting plate so as to operate said back plate clamping means; and wherein the plunger retracting means includes a transverse bore in each clamping plunger and a wedge rod extending transversely to the clamping plunger so as to reach through its transverse bore;

the transverse bore of the clamping plunger defines an axially forwardly facing tapered face and an opposite, axially rearwardly facing extension drive taper;

the wedge rod portion reaching through the transverse bore of the clamping plunger has an axially rearwardly facing tapered face which is inclined to the axis of the wedge rod and cooperates with the tapered face of the transverse bore to translate an axial displacement of the wedge rod into a much smaller retracting displacement of the clamping plunger, while applying to said clamping plunger a retraction force which is correspondingly greater than the axial force applied to the wedge rod; and the wedge rod portion reaching through the transverse bore of the clamping plunger further includes an axially forwardly facing drive protrusion which cooperates with the extension drive taper of the transverse bore to forcibly translate an opposite axial displacement of the wedge rod into a corresponding extension displacement of the clamping plunger.

2. A die attachment mechanism as defined in claim 1, wherein the axially forwardly facing drive protrusion of the wedge rod is a drive pin which is seated in a transverse bore of the wedge rod, the drive pin having a drive extremity extending radially outwardly from the wedge rod into driving contact with the extension drive taper of the transverse plunger bore.

3. A die attachment mechanism as defined in claim 2, wherein the transverse bore of the wedge rod is a threaded bore, and the drive pin is a threaded drive pin which it is seated in the threaded transverse bore;

the drive extremity of the drive pin is rounded; and the clamping plunger includes an axial bore extending from its rear extremity to its transverse bore, for the insertion of the drive pin into its threaded bore, following the insertion of the wedge rod into the transverse bore of the clamping plunger.

4. A die attachment mechanism as defined in claim 3, wherein the threaded drive pin is permanently secured in the threaded transverse bore of the wedge rod by means of a two-component adhesive; and the axial bore in the clamping plunger also serves as a lubrication channel, the clamping plunger including a lubrication fitting at the rearward end of said bore.

5. A die attachment mechanism as defined in claim 2, wherein the drive pin has a cylindrical body portion;

the transverse bore of the wedge rod is a stepped bore, with a smaller bore portion open to its tapered face and a larger bore portion open to the opposite side and serving as a seating bore for the cylindrical body portion of the drive pin;

the clamping plunger includes an axial insertion channel extending from its forward extremity to its transverse bore, for the insertion of the drive pin into its seating bore; and the insertion channel is so arranged in relation to the stepped bore in the wedge rod that alignment therebetween, for the insertion of the drive pin into the seating bore, is obtained only by moving the wedge rod beyond one of its two operational end positions in which the clamping plunger is clamped and released, respectively.

6. A die attachment mechanism as defined in claim 5, wherein the insertion channel is the forward portion of a bore which extends axially through the clamping plunger and intersects the axis of its transverse bore.

7. A die attachment mechanism as defined in claim 6, wherein the rearward portion of said axial bore in the clamping plunger serves as a lubrication channel, the clamping plunger including a lubrication fitting at the rearward end of said bore.

8. A die attachment mechanism as defined in claim 5, wherein the insertion channel is the forward portion of a longitudinal groove in the clamping plunger which intersects the axis of its transverse bore.

9. A die attachment mechanism as defined in claim 1, wherein the wedge rod is guided in a guide bushing which is removably mounted in an enlarged bore portion of a radial bore in the die carrier plate; and the enlarged bore portion extends at least as far as the axial guide bore of the clamping plunger so that, when the wedge rod guide bushing is removed from the enlarged bore portion, the wedge rod together with its drive protrusion is insertable and removable through the enlarged bore portion.

10. A die attachment mechanism as defined in claim 1, wherein the cooperating tapered faces of the wedge rod and of the transverse bore in the clamping plunger are so inclined to the axis of the wedge rod that a pulling displacement of the wedge rod creates a retracting displacement of the clamping plunger.

11. A die attachment mechanism as defined in claim 10, wherein the angle included between the tapered face of the wedge rod and its longitudinal axis is smaller than the angle of response of the cooperating tapered faces of the wedge rod and transverse bore of the clamping plunger, with the effect of producing a self-locking force relationship between the wedge rod and the clamping plunger.

12. A die attachment mechanism as defined in claim 1, wherein the means for moving the wedge rod includes a double-acting hydraulic cylinder assembly with a piston rod which is solidary with the wedge rod.

13. A die attachment mechanism as defined in claim 12, wherein the wedge rod is guided in a wedge rod bore in the die carrier plate; and the hydraulic cylinder assembly includes a guide bushing which is recessed into the wedge rod bore, so as to protrude in part from the outer side of the die carrier plate, and a pot-shaped hydraulic cylinder which is clamped against a centering shoulder on the protruding portion of the guide bushing.

14. A die attachment mechanism as defined in claim 1, wherein the back plate clamping means includes forwardly facing clamping shoulders on the periphery of each back plate and radially inwardly projecting clamping noses with rearwardly facing clamping faces on the protruding forward extremities of the clamping plungers, the clamping faces of the clamping plungers bearing against the clamping shoulders of the back plates, when the clamping plunger retracting means is actuated to operate the back plate clamping means.

15. A die attachment mechanism as defined in claim 14, wherein the die halves define a generally rectangular outline with their radial dimensions; and the back plates are likewise of generally rectangular outline, exceeding the radial dimensions of the die halves on at least those sides on which they cooperate with clamping plungers to define said back plate clamping means, the back plates thereby forming radially protruding straight flange portions with radial clamping shoulders, with the result that the clamping noses of the clamping plungers will transmit only axial clamping forces to the die halves.

16. A die attachment mechanism as defined in claim 15, wherein the clamping plungers have a generally cylindrical shape and their protruding forward extremities have a radial recess to the rear of the clamping nose, so that the clamping nose of each clamping plunger is encompassed within its cylindrical outline; and the protruding flange portions of the back plates reach into the radial recesses of the clamping plungers.

17. A die attachment mechanism as defined in claim 1, further comprising means for radially guiding the injection molding die in relation to the die carrier plates during insertion and removal of the die; and means for centering the injection molding die in relation to the die carrrier plates at the end of the die insertion movement.

18. A die attachment mechanism as defined in claim 17, wherein the die guiding means includes horizontal guide bars on the two die carrier plates engaging radially downwardly facing guide faces of the two back plates of the die from underneath, so as to support and guide the die during insertion and removal in a horizontal radial direction.

19. A die attachment mechanism as defined in claim 18, wherein the die centering means includes abutment members on the two die carrier plates cooperating with the two back plates of the die, so as to stop the horizontal die insertion movement, when the die has reached its centered position.

20. A die attachment mechanism as defined in claim 17, wherein the guide means includes vertical guide bars on the two die carrier plates engaging radially outwardly facing guide faces of the two back plates of the die from opposite radial sides, so as to guide the die during insertion and removal in a vertical direction; and the die centering means includes abutment members on the two die carrier plates cooperating with the two back plates of the die, so as to support the injection molding die in its vertically centered position.

* * * * *